(12) United States Patent
Toniolo et al.

(10) Patent No.: US 11,815,352 B2
(45) Date of Patent: Nov. 14, 2023

(54) APPARATUS AND METHOD FOR DETERMINING BOREHOLE SIZE WITH A BOREHOLE IMAGING TOOL

(71) Applicant: Schlumberger Technology Corporation, Sugar Land, TX (US)

(72) Inventors: Julien Toniolo, Houston, TX (US); Alan J. Sallwasser, Houston, TX (US); Peter Wells, Houston, TX (US); Mark A. Fredette, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/217,734

(22) Filed: Mar. 30, 2021

(65) Prior Publication Data

US 2021/0239448 A1 Aug. 5, 2021

Related U.S. Application Data

(63) Continuation-in-part of application No. 14/624,368, filed on Feb. 17, 2015, now abandoned.

(51) Int. Cl.
*G01B 7/13* (2006.01)
*G01V 3/38* (2006.01)
(Continued)

(52) U.S. Cl.
CPC ............ *G01B 7/13* (2013.01); *E21B 47/0025* (2020.05); *G01V 3/26* (2013.01); *G01V 3/38* (2013.01)

(58) Field of Classification Search
CPC .... G01R 33/09; G01R 33/091; G01R 33/093; G01R 33/095; G01R 33/096;
(Continued)

(56) References Cited

U.S. PATENT DOCUMENTS 3,474,541 A 10/1969 Cubberly, Jr.
3,898,555 A 8/1975 Tellerman
(Continued)

FOREIGN PATENT DOCUMENTS

SU 1574804 A1 * 6/1990

OTHER PUBLICATIONS

MTS Sensors: Temposonics Absolute, Non-Contact Position Sensor, May 2013, pp. 1 and 2.
(Continued)

*Primary Examiner* — David M Schindler
(74) *Attorney, Agent, or Firm* — Jeffrey D. Frantz

(57) ABSTRACT

A downhole borehole imaging tool and methods for determining a borehole size includes a magnetoresistive system and a hub moveably coupled to a fixed tool string. The hub includes a magnet. The magnetoresistive system includes magnetoresistive sensors disposed within the fixed tool string and segregated from the magnet. During operation, a routine scan of all sensors measures, for example, the output voltage V, angle θ of magnetic field, and temperature. Measurements from each sensor may then be characterized to account for temperature and input voltages variation of the sensors. The most accurate measurement can be used to derive the position of the hub 44 using the previous baseline parameters stored in the tool.

20 Claims, 14 Drawing Sheets

(51) Int. Cl.
*G01V 3/26* (2006.01)
*E21B 47/002* (2012.01)

(58) Field of Classification Search
CPC ........ G01R 33/098; G01D 5/16; G01D 5/165;
E21B 47/09; E21B 47/0905; E21B 47/01;
E21B 47/08; E21B 47/085; E21B
17/1021; E21B 17/1028; E21B 47/0025;
E21B 47/092; G01V 3/18; G01V 3/20;
G01V 3/22; G01V 3/24; G01V 3/26;
G01V 3/265; G01V 3/28; G01V 3/30;
G01V 3/38; G01B 21/14; G01B 7/13
See application file for complete search history.

(56) References Cited

U.S. PATENT DOCUMENTS

| | | | |
|---|---|---|---|
| 4,121,345 A | 10/1978 | Roesner | |
| 4,205,266 A | 5/1980 | Lichtenberg | |
| 4,407,157 A | 10/1983 | Lichtenberg | |
| 4,540,941 A | 9/1985 | Walkow | |
| 5,473,245 A | 12/1995 | Silvus, Jr. et al. | |
| 5,917,774 A | 6/1999 | Walkow et al. | |
| 6,560,889 B1 | 5/2003 | Lechen | |
| 6,588,542 B2 | 7/2003 | Nakajima et al. | |
| 6,605,939 B1 | 8/2003 | Jansseune et al. | |
| 6,647,637 B2 | 11/2003 | Lechen | |
| 6,803,758 B1 | 10/2004 | Nicholson | |
| 6,810,754 B2 | 11/2004 | May | |
| 6,833,706 B2 | 12/2004 | Niina | |
| 6,848,189 B2 | 2/2005 | Moake et al. | |
| 6,917,303 B2 | 7/2005 | Stuart-Bruges et al. | |
| 6,992,479 B2 | 1/2006 | Lequesne et al. | |
| 7,059,238 B2 | 6/2006 | Albright et al. | |
| 7,069,775 B2 | 7/2006 | Fredette et al. | |
| 7,131,210 B2 | 11/2006 | Fredette et al. | |
| 7,242,182 B2 | 7/2007 | Finkler et al. | |
| 7,394,244 B2 | 7/2008 | Schley et al. | |
| 7,521,923 B2 | 4/2009 | May et al. | |
| 8,074,511 B2 | 12/2011 | Huiszoon et al. | |
| 8,222,892 B2 | 7/2012 | Hosek et al. | |
| 8,237,443 B2 | 8/2012 | Hopmann et al. | |
| 8,484,858 B2 | 7/2013 | Brannigan et al. | |
| 8,561,478 B2 | 10/2013 | Maute et al. | |
| 9,963,954 B2* | 5/2018 | Al-Mulhem | E21B 41/0035 |
| 2002/0145422 A1 | 10/2002 | Chamings et al. | |
| 2003/0184305 A1* | 10/2003 | Niina | G01V 3/081 324/252 |
| 2006/0011385 A1 | 1/2006 | Seydoux et al. | |
| 2006/0064889 A1 | 3/2006 | Fredette et al. | |
| 2007/0186432 A1 | 8/2007 | Hauch et al. | |
| 2009/0128141 A1 | 5/2009 | Hopmann et al. | |
| 2012/0011928 A1* | 1/2012 | Wootten | G01F 1/115 73/152.29 |
| 2012/0037422 A1 | 2/2012 | Rasheed | |
| 2012/0055711 A1 | 3/2012 | Brannigan et al. | |
| 2012/0146625 A1 | 6/2012 | Grommer et al. | |
| 2012/0158270 A1 | 6/2012 | Bur et al. | |
| 2012/0198927 A1 | 8/2012 | Maute et al. | |
| 2012/0249128 A1 | 10/2012 | Zhou et al. | |
| 2013/0002255 A1 | 1/2013 | Shampine | |
| 2013/0113468 A1 | 5/2013 | Gao et al. | |
| 2015/0143709 A1 | 5/2015 | Sallwasser | |
| 2016/0237809 A1 | 8/2016 | Toniolo et al. | |
| 2017/0167244 A1* | 6/2017 | Beckman | G01D 5/2291 |

OTHER PUBLICATIONS

Parker: Wavescale: Linear Displacement Transducers: Mar. 2005 (12 pages).

\* cited by examiner

APPARATUS AND METHOD FOR DETERMINING BOREHOLE SIZE WITH A BOREHOLE IMAGING TOOL

BACKGROUND

This disclosure relates generally to the field of downhole tools and, more particularly, to systems and methods for determining borehole size.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions.

In hydrocarbon drilling operations, downhole tools including logging borehole imaging tools may be lowered into a borehole to perform specific tasks. For example, a logging string system may be lowered through a drill string or downhole tubular. The logging string system includes a logging tool that takes various measurements, which may range from measurements such as pressure or temperature to advanced measurements such as rock properties, fracture analysis, fluid properties in the borehole, or formation properties extending into the rock formation. Traditionally, to identify and characterize features such as fractures, faults, and layers of different lithologies, logging borehole imaging tools have been used. They are called imaging tools because their main output is an image of the borehole wall where each of their measuring electrodes is a pixel of the image.

Borehole imaging logging tools traditionally include three types of measurements integrated in the tool to recognize, orient, and characterize borehole wall features. One measurement is an imaging measurement that is obtained by transmitting electrical signals at various frequencies, voltages, currents, and fields in the formation and borehole contacting pads that receive a modified signal. A part of the transformation between the transmitted and received signals is representative of the near borehole wall properties and can be used to create the borehole wall image. The shallow, near borehole, measurement is called microresistivity. The borehole contacting pads or micoresistivity pads are traditionally mounted on rigid arms that are spring loaded to contact the formation.

Another measurement is a direction and inclination measurement that features inclinometers, gyrometers, and/or magnetometers, which may be used to define three angles of the tool (e.g., well azimuth, inclination, and tool face) and to orient the image in a reference frame when used in combination with the tool depth as provided by a coiled tubing unit, wireline, or slick line depth, or drillers depth.

The third measurement is a caliper measurement. The caliper corresponds to the local diameter, or pair of opposite radii of the borehole, and is derived using the relative position of the microresistivity pads that contact the borehole wall. The traditional way for measuring the position of the pads that contact the borehole wall relative the tool is by using linkages and a contact measurement sensor like a potentiometer or a linear variable differential transformer (LVDT) mechanically attached to the tool mandrel and to the pad arms.

Designers have relied on potentiometers or LVDTs because they are robust, precise, simple to design, and are suitable for the high temperatures and high pressures encountered downhole. However, there are significant limitations to potentiometers and LVDTs. Standard LVDTs usually comprise a coupling rod made of high magnetic permeability material that is axially moved in an arrangement of coils. Attaching the LVDT rod to the moving device and keeping the coils steady is common practice, but the small linkages and hydraulic seals can become clogged with debris downhole, which can cause erroneous measurements. Potentiometers encounter the same issues and also need to be run in a clean fluid as any contaminants would lead to erroneous measurements.

There is a need for determining a borehole diameter where the apparatus avoids bulky mechanisms, the need for maintenance, and inherent small gaps between moving parts where debris can be trapped leading to failure of the equipment or to incorrect measurements. The present disclosure presents an apparatus and methods for determining a borehole diameter where the apparatus is compact, resistant to collecting debris, and reduces maintenance as compared to standard equipment in the art for determining diameter of the downhole borehole.

BRIEF DESCRIPTION OF THE DRAWINGS

Various aspects of this disclosure may be better understood upon reading the following detailed description and upon reference to the drawings in which.

DETAILED DESCRIPTION

Figure 1:
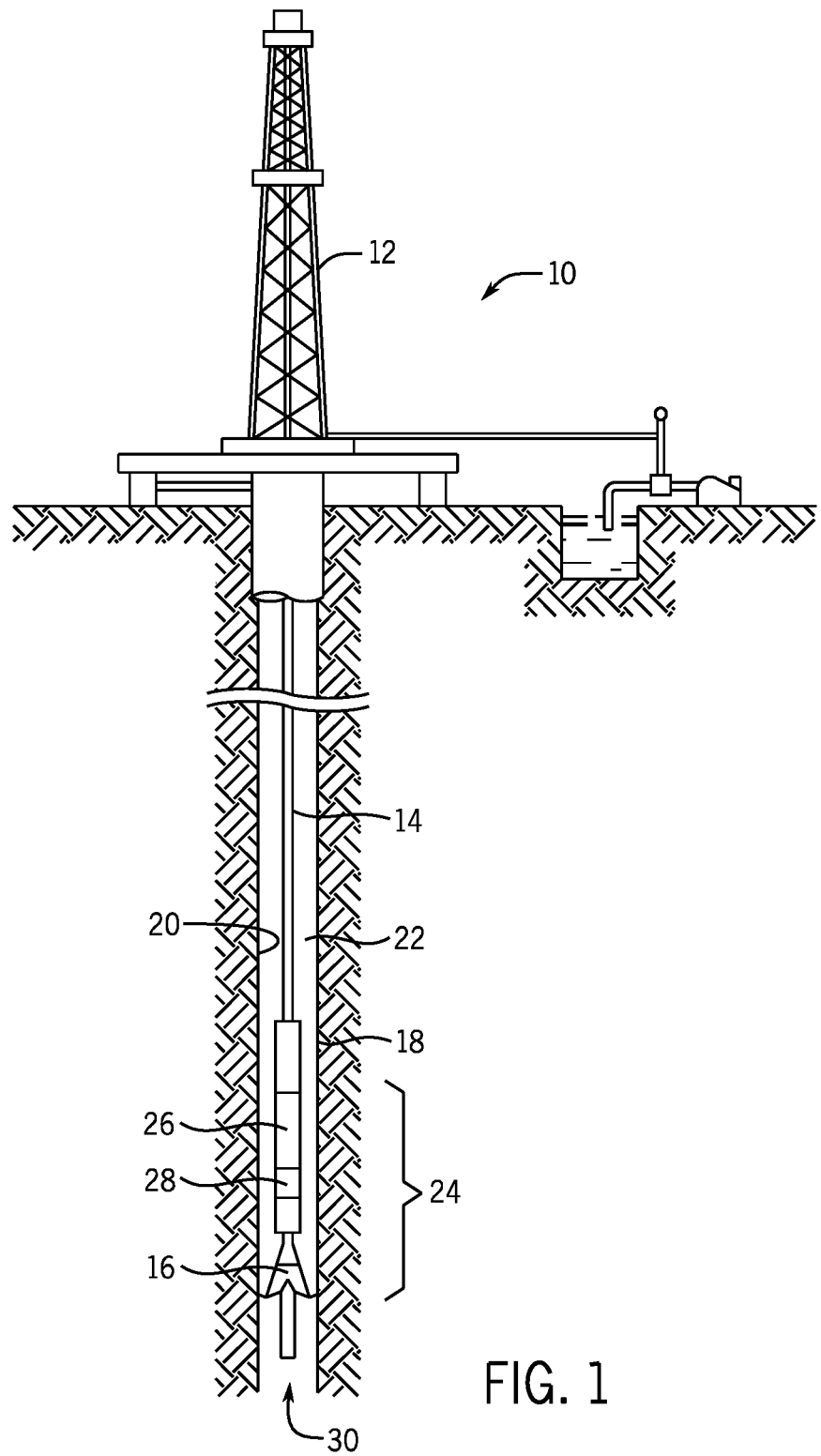
FIG. 1 shows a schematic view of an embodiment of a drilling system, in accordance with various embodiments of the present disclosure.

One or more specific embodiments of the present disclosure will be described below. These described embodiments are just examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed toward systems and methods for determining borehole size or diameter with a downhole imaging tool. In some cases, the axial position of a magnet disposed on a movable member may correspond to a radial position of a spring connected to the movable member. The movable member may be a hub that connects to a pair of opposing springs or arms connected to sensor pads. In examples where the downhole tool includes a caliper, the caliper may include a moveable hub that axially moves along a logging tool as the radial position of the caliper changes. Moreover, the logging tool may include a position sensor to interact with the hub to generate a signal indicative of the axial position of the hub. In certain embodiments, the position sensor includes an array of magnetoresistive sensors that interact with the magnet in the hub. Additionally or alternatively, the position sensor may include an inverted linear variable differential transformer that generate a differential voltage based on the hub position along the logging tool. Moreover, the position sensor may, in certain examples, include a reflective sensor that receive a signal and send a reflected signal back toward a source.

As noted above, the axial position of the hub may correspond to a radial position of a mechanical caliper. It should be appreciated, however, that the systems and methods for determining the position of the hub may be used in downhole tools that do not include a caliper and instead use the position of the hub in other ways (e.g., an anchoring device, a centralizer, a fishing tool).

Referring now to FIG. 1, an embodiment of a downhole drilling system 10 (e.g., drilling system) comprises a rig 12 and a drill string 14 coupled to the rig 12. The drill string 14 includes a drill bit 16 at a distal end that may be rotated to engage a formation and form a borehole 18. As shown, the borehole 18 includes a borehole sidewall 20 (e.g., sidewall) and an annulus 22 between the borehole 18 and the drill string 14. Moreover, a bottom hole assembly (BHA) 24 is positioned at the bottom of the borehole 18. The BHA 24 may include a drill collar 26, stabilizers 28, or the like.

During operation, drilling mud or drilling fluid is pumped through the drill string 14 and out of the drill bit 16. The drilling mud flows into the annulus 22 and removes cuttings from a face of the drill bit 16. Moreover, the drilling mud may cool the drill bit 16 during drilling operations. In the illustrated embodiment, the drilling system 10 includes a logging tool 30. As shown, the logging tool 30 may extend through the drill bit 16. The logging tool 30 may conduct downhole logging operations to obtain various measurements in the borehole 18. For example, the logging tool 30 may include sensors (e.g., resistive, nuclear, photonic, seismic, etc.) to determine various borehole and/or fluidic properties. Additionally, the logging tool 30 may include sampling tools to obtain core samples, fluid samples, or the like from the borehole 18. Moreover, in certain embodiments, the logging tool 30 may include mechanical measurement devices, such as calipers, to obtain measurements of the borehole 18.

The logging tool 30 may conduct downhole operations while the drill string 14 is positioned within the borehole 18 and while the drill string 14 is being removed from the borehole 18. For example, the logging tool 30 may be extended through the drill bit 16 and begin logging operations. Then, the drill string 14 may be removed from the borehole 18 while the logging tool 30 is extended through the drill bit 16. While the illustrated embodiment includes a substantially vertical borehole 18, in other embodiments the borehole 18 may be deviated or substantially horizontal. Additionally, while the illustrated example includes the logging tool 30 extending from the drill bit 16, in other embodiments, the logging tool 30 may be a separate sub coupled to the drill string 14.

Figure 2:
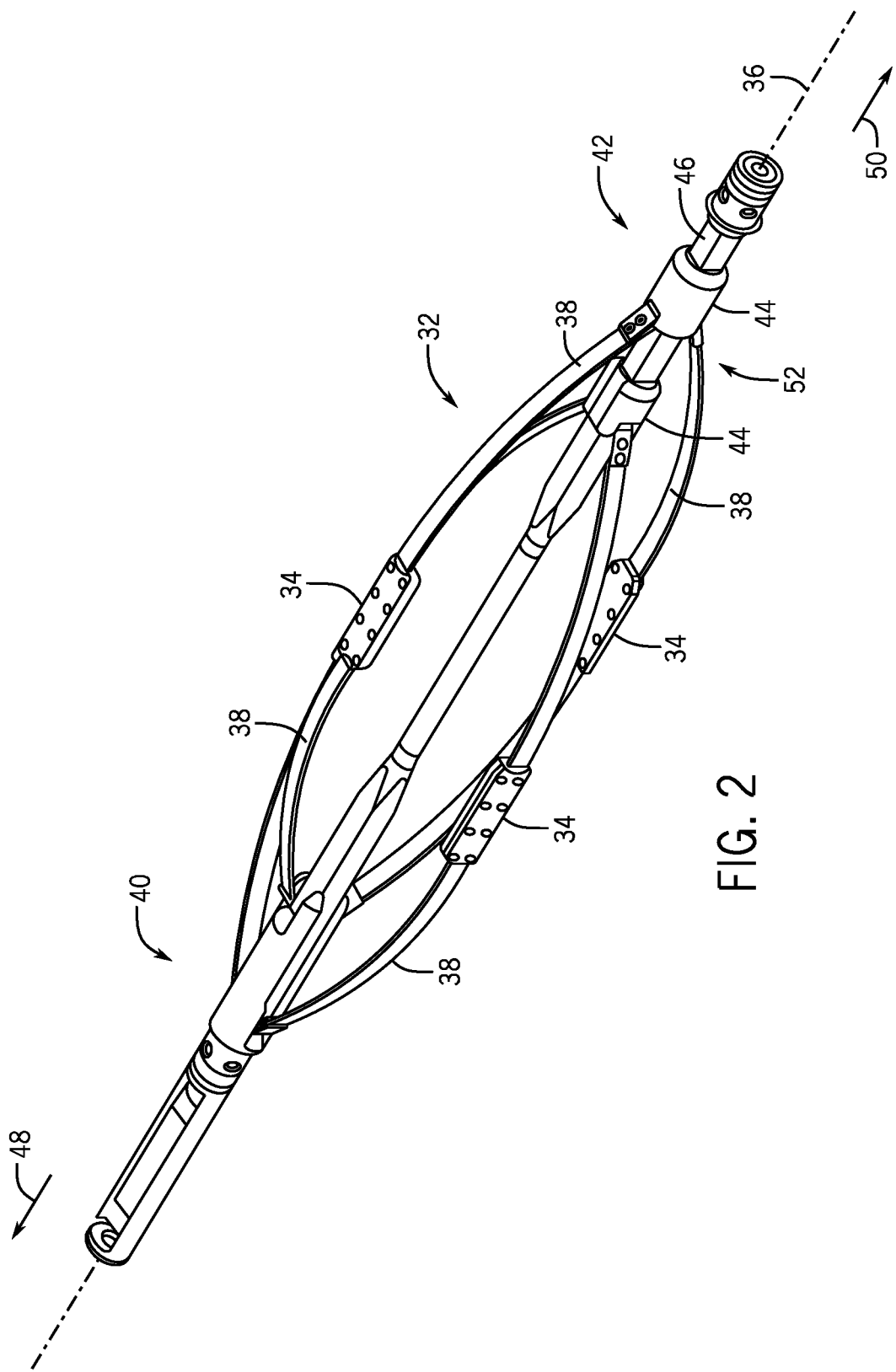
FIG. 2 shows a perspective view of an embodiment of a logging tool having a caliper tool, in accordance with various embodiments of the present disclosure.

FIG. 2 shows an isometric view of an example of the logging tool 30. In the illustrated example, the logging tool 30 includes mechanical calipers 32 (e.g., calipers) with sensors 34. In certain embodiments, the calipers 32 expand radially with respect to a logging tool axis or longitudinal axis 36. The calipers 32 may contact the sidewall 20 of the borehole 18 to obtain various measurements. For example, the calipers 32 may be used to determine the diameter of the borehole 18. Additionally, in certain embodiments, the calipers 32 may press the sensors 34 against the sidewall 20 of the borehole 18, thereby enabling additional measurements (e.g., resistivity, nuclear, photonic, seismic, etc.) of the formation. However, in other embodiments, the sensors 34 may be non-contact sensors and may not contact the sidewall 20 of the borehole 18 to obtain formation measurements.

In the illustrated embodiment, the calipers 32 include springs 38 that drive the calipers 32 radially outward with respect to the logging tool axis 36. That is, the springs 38 are biased to enable expansion of the calipers 32 after the logging tool 30 is extended through the drill bit 16. For example, springs 38 may be bow springs with sensors 34 mounted thereon with the bow springs configured to remain in contact with the borehole wall by having a free-state curvature greater than a radius of the borehole. However, in other embodiments, the calipers 32 may include mechanical actuators to facilitate deployment of the calipers 32. For example, the mechanical actuators may block expansion of the calipers 32 until activated. In embodiments where the logging tool 30 extends through the drill bit 16, the mechanical actuators may block deployment of the calipers 32 until the logging tool 30 is through the drill bit 16.

As shown, the calipers 32 are coupled to the logging tool 30 at a first location 40 and at a second location 42. The first location 40 is axially farther up the borehole 18 (e.g., closer to the surface) than the second location 42. As will be described below, the first location 40 may be rigidly fixed to the logging tool 30. Moreover, the second location 42 may move and/or slide axially along the logging tool axis 36. For example, the second location 42 may be positioned on a hub 44 (e.g., a moveable member) positioned radially about a tool string 46 (e.g., a shaft, a fixed member) of the logging tool 30. As also shown, an outer cross-sectional shape of the tool string 46 about which the hub 44 may be positioned on, can include a corner.

The hub 44 may slide along the tool string 46 in response to the radial expansion and/or compression of the calipers 32. In certain embodiments, the hub 44 includes rollers, bearings, or the like to facilitate axial movement along the tool string 46. For example, radial expansion of the calipers 32 drives the hub 44 in a first direction 48 along the logging tool axis 36 (e.g., toward the first location 40, toward the surface). Additionally, radial compression of the calipers 32 drives the hub 44 in a second direction 50 along the logging tool axis 36 (e.g., away from the first location 40, toward the bottom of the borehole 18). As will be described in detail below, the axial movement of the hub 44 along the logging tool axis 36 may be used to determine the radial position of the calipers 32 via a position system 52.

In the illustrated embodiment, four calipers 32 are coupled to two hubs 44. As shown, the calipers 32 are positioned approximately 90 degrees offset from the adjacent calipers 32. As a result, four measurements may be obtained indicative of the radius of the borehole 18. However, in other embodiments, more or fewer calipers 32 may be utilized. For example, 2, 3, 5, 6, 7, 8, or any suitable number of calipers 32 may be positioned on the tool string 46 to obtain borehole measurements. Moreover, in the illustrated embodiment, each hub 44 is coupled to two calipers 32, facilitating multiple independent measurements of the borehole 18. However, in other embodiments, more of fewer hubs 44 may be utilized. For example, each caliper 32 may be independently coupled to a single hub 44.

Figure 3:
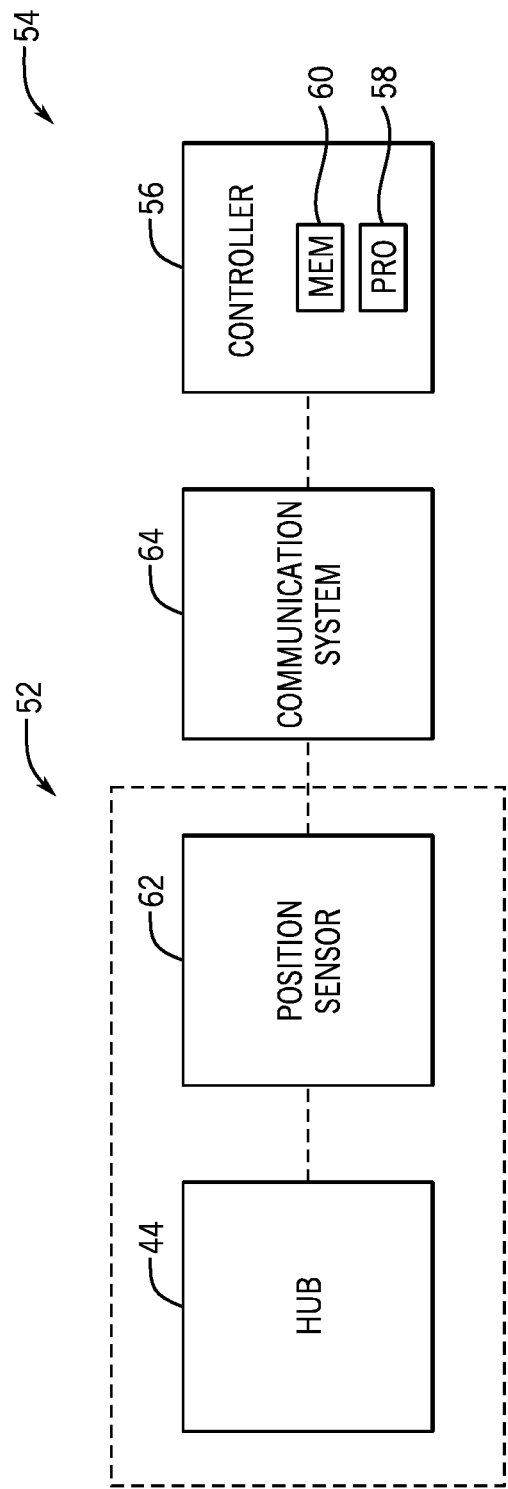
FIG. 3 shows a block diagram of an embodiment of a control system, in accordance with various embodiments of the present disclosure.

FIG. 3 is a block diagram of an embodiment of a control system 54 that determine the radial position of the calipers 32 relative to the logging tool axis 36. The control system 54 includes a controller 56 having a processor 58 and a memory 60. The memory 60 may include one or more non-transitory (i.e., not merely a signal), computer-readable media, which may include executable instructions that may be executed by the processor 58. The controller 56 receives a signal from the position system 52 indicative of a position of the hub 44 along the tool string 46. For example, the position system 52 may include a position sensor 62 that interacts with the hub 44 (e.g., wirelessly, electrically, magnetically, etc.) to determine the position of the hub 44 on the tool string 46.

In the illustrated embodiment, the position system 52 is communicatively coupled to a communication system 64. The communication system 64 may send a signal to the surface (e.g., to a surface controller) indicative of the radial position of the calipers 32. In certain embodiments, the communication system 64 includes a telemetry system, a wireless transceiver, a wired communication line (e.g., Ethernet, fiber optic, etc.), or the like to transmit data from the logging tool 30 to the surface. Moreover, the communication system 64 may include a wired or wireless transceiver to receive and/or transmit data between the logging tool 30 and the position system 52 and/or the sensors 34. The communication system 64 sends the signal to the controller 56 to coordinate drilling, completion, and/or cementing operations.

Figure 4:
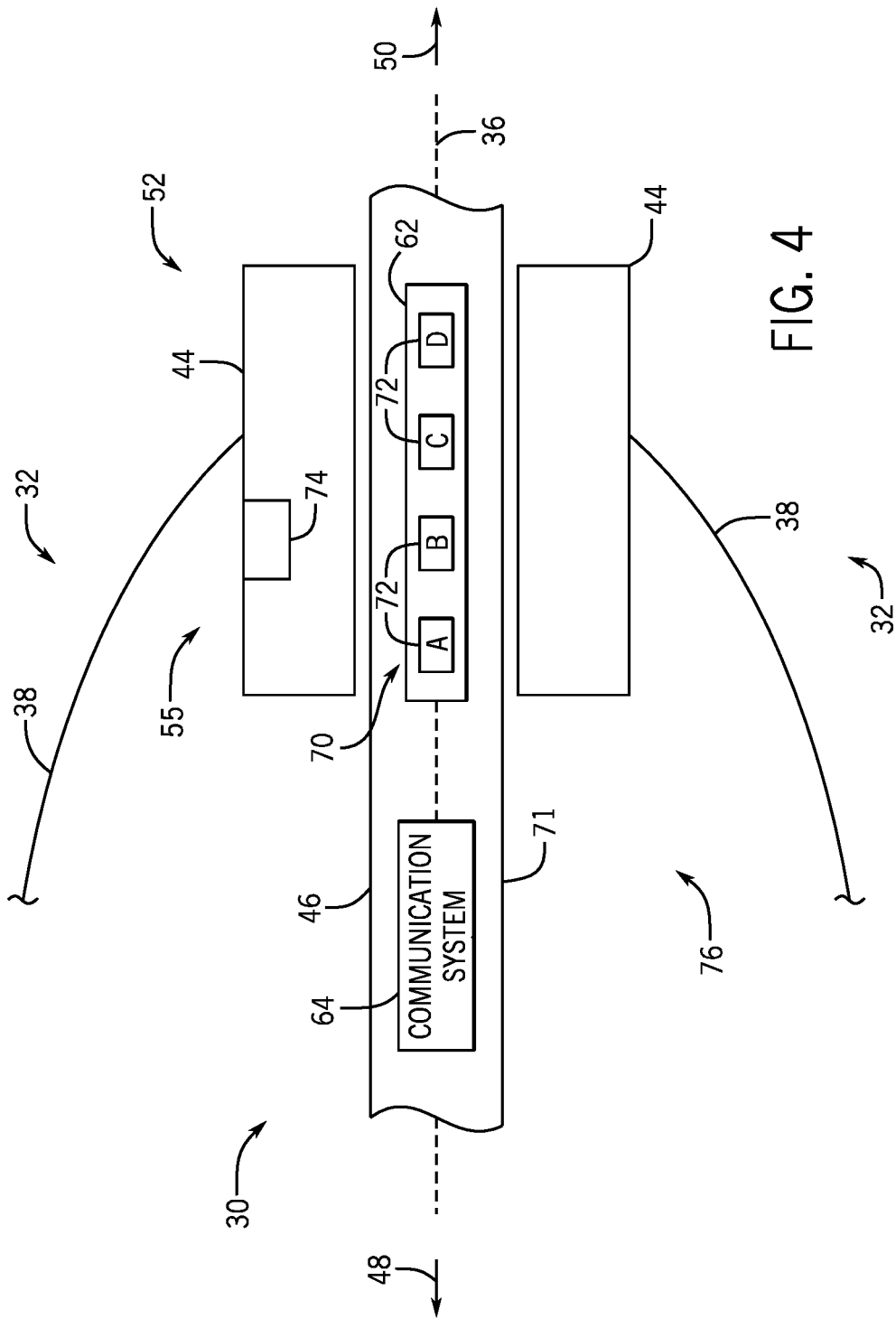
FIG. 4 shows a partial schematic cross-sectional view of an embodiment of a position system having a magnetoresistive system in a first position, in accordance with various embodiments of the present disclosure.

FIG. 4 is a partial schematic cross-sectional view of an embodiment of the position system 52 having a magnetoresistive system 55 positioned along the logging tool 30. In the illustrated embodiment, the position system 52 includes the hub 44 and the position sensor 62. The position system 52 is communicatively coupled to the communication system 64, as described above, to transmit data indicative of the position of the hub 44 on the tool string 46. In the illustrated embodiment, the position sensor 62 includes an array 70 of magnetoresistive sensors 72. While the illustrated embodiment includes four magnetoresistive sensors 72, in other embodiments the array 70 may include 1, 2, 3, 5, 6, 7, 8, 9, 10, or any suitable number of magnetoresistive sensors 72. Additionally, because the magnetoresistive sensors 72 are disposed within the tool string 46, they may be at a pressure (e.g., a second pressure) substantially equal to atmospheric pressure. In other words, the magnetoresistive sensors 72 may be substantially isolated from the borehole pressure and protected by a housing 71 comprising a non-magnetic material. Moreover, a magnet 74 is positioned within the hub 44. However, in other embodiments, the magnet 74 may be positioned on the hub 44 and be exposed to borehole pressure (e.g., a first pressure). In certain embodiments, the magnet 74 may be an electromagnet that transmits a magnetic field toward the array 70. However, in other embodiments, the magnet 74 may be a permanent or temporary magnet. The magnetoresistive sensors 72 may change a value of electrical resistance in response to the magnetic field transmitted by the magnet 74. However, as shown, the magnet 74 and the array 70 are segregated from one another. Accordingly, as the hub 44 moves along the tool string 46 in the first direction 48 and the second direction 50, the electrical resistance of the magnetoresistive sensors 72 will change relative to the position of the hub 44.

In the illustrated embodiment, the hub 44 is in a first position 76. In the first position 76, the magnet 74 is interacting with the magnetoresistive sensor 72b. In other words, the magnetic field transmitted by the magnet 74 is changing the electrical resistance of the magnetoresistive sensor 72b (e.g., based on resistance measured across the magnetoresistive sensor 72b). As a result, the position sensor 62 may send a signal to the communication system 64 indicative of the changed resistance of the magnetoresistive sensor 72b. Accordingly, the controller 56 may determine the position of the hub 44. For example, the magnetoresistive sensor 72b may correspond to a location on the tool string 46. Moreover, the position of the hub 44 may correspond to a radial position of the caliper 32. That is, the caliper 32 may be calibrated to associate different hub positions with associated radial positions of the calipers 32. As shown in FIG. 4, an inner surface of a bore defined by the hub 44 disposed about the tool string 46 and an outer surface of the tool string 46 can be separated by a gap such that the inner surface of the bore defined by the hub 44 and the outer surface of the tool string 46 are directly opposed to one another.

Figure 5:
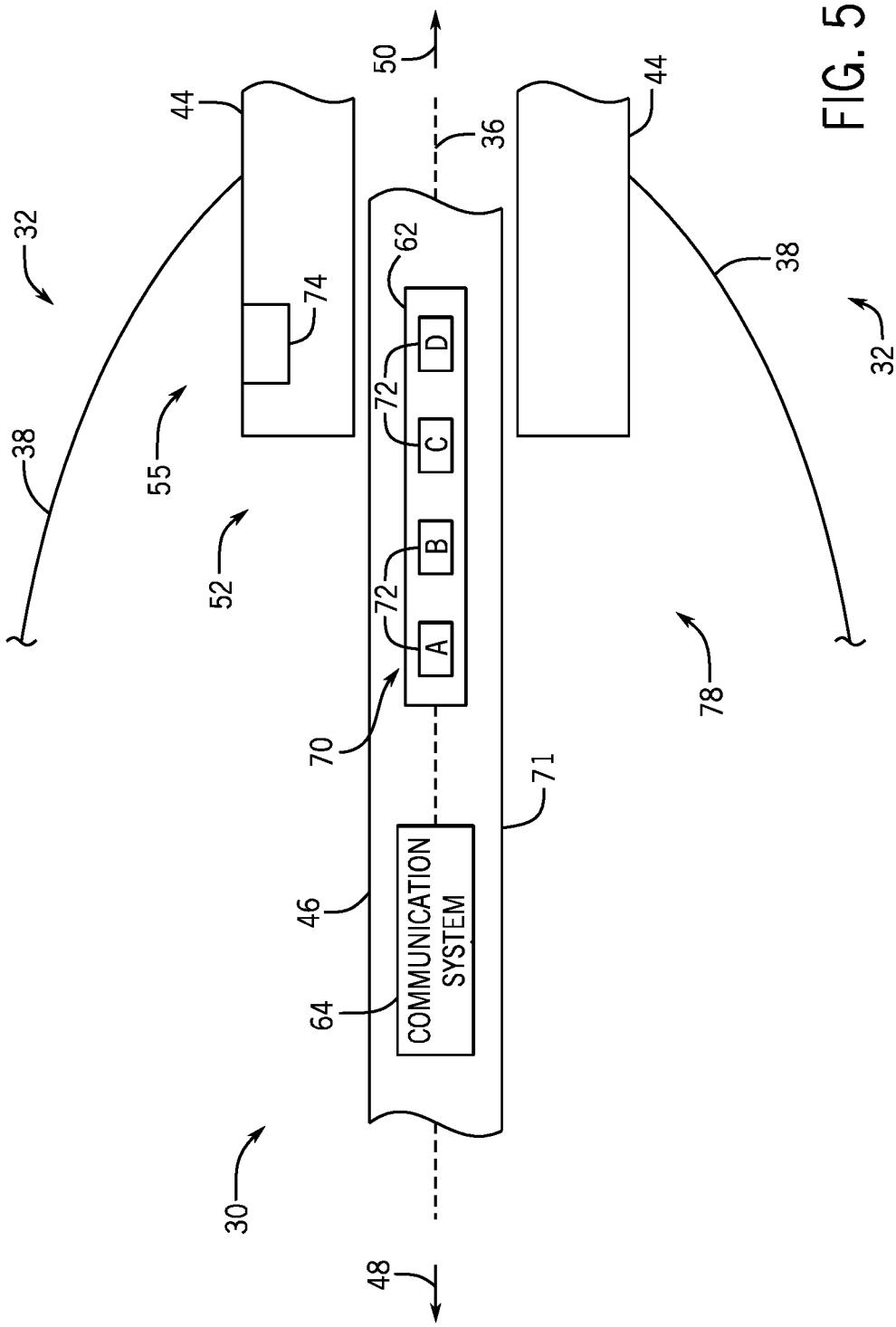
FIG. 5 shows a partial schematic cross-sectional view of the position system of FIG. 4 in a second position, in accordance with various embodiments of the present disclosure.

FIG. 5 is a partial schematic cross-sectional view of an embodiment of the position system 52 with magnetoresistive system 55, in which the hub 44 is in a second position 78. As described above, the magnet 74 in the hub 44 may interact with the magnetoresistive sensors 72 of the array 70. In the second position 78, the hub 44 moves in the second direction 50 axially along the logging tool axis 36, relative to the first position 76. For example, the calipers 32 may be radially compressed (e.g., due to contact with the sidewall 20), thereby driving the hub 44 in the second direction 50. As a result, the magnet 74 interacts with the magnetoresistive sensor 72d. As mentioned above, the position of the magnetoresistive sensor 72d may correspond to a radial position of the calipers 32. Accordingly, the radial position of the calipers 32 may be determined as the axial position of the hub 44 changes.

A magnetic field generated by a magnet typically varies as a function of pressure and temperature and may be different from one magnet to another based on manufacturing variation. This is also the case for magnets traditionally used downhole (e.g., magnets made of samarium-cobalt that are used for their high temperature tolerance and strong resistance to corrosion and oxidation). To remove influence of pressure and temperature on the magnets, sensors in which the output does not depend on the strength of the magnetic field they measure are used. Thus, linear Hall-effect sensors would not be appropriate in the disclosed embodiments as Hall sensors measure the magnitude of a magnetic field with its output voltage being directly proportional to the magnetic strength through it.

Figure 6:
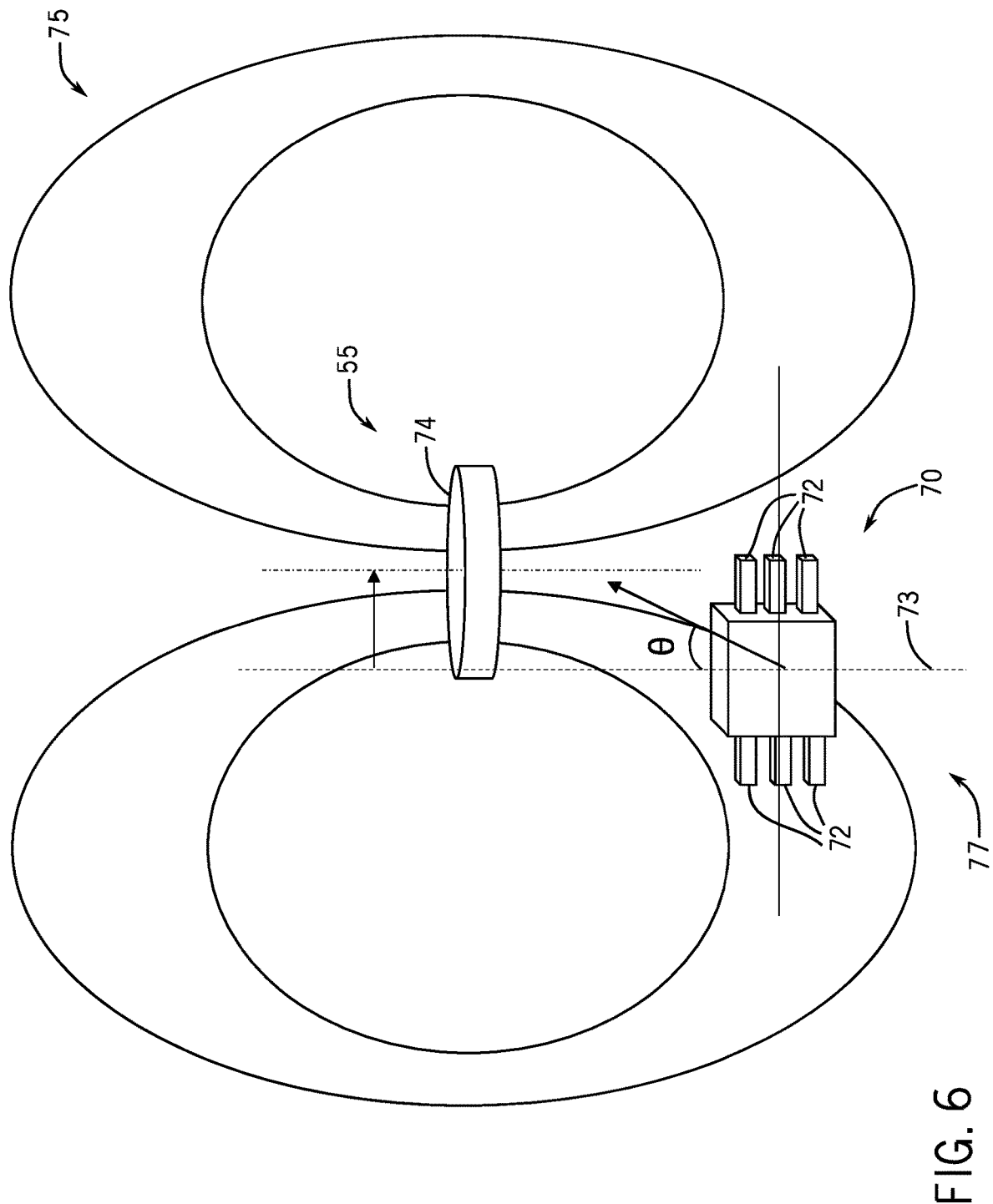
FIG. 6 shows a schematic view of the magnetoresistive system of FIG. 4 in a first position, in accordance with various embodiments of the present disclosure.

FIG. 6 is a schematic view of the magnetoresistive system 55 of FIG. 4 in a first position 77. The magnet 74 generates a magnetic field 75 and the array 70 of magnetoresistive sensors 72 measures an angle θ of the magnetic field 75 relative to an axis 73 of the array 70.

Figure 7:
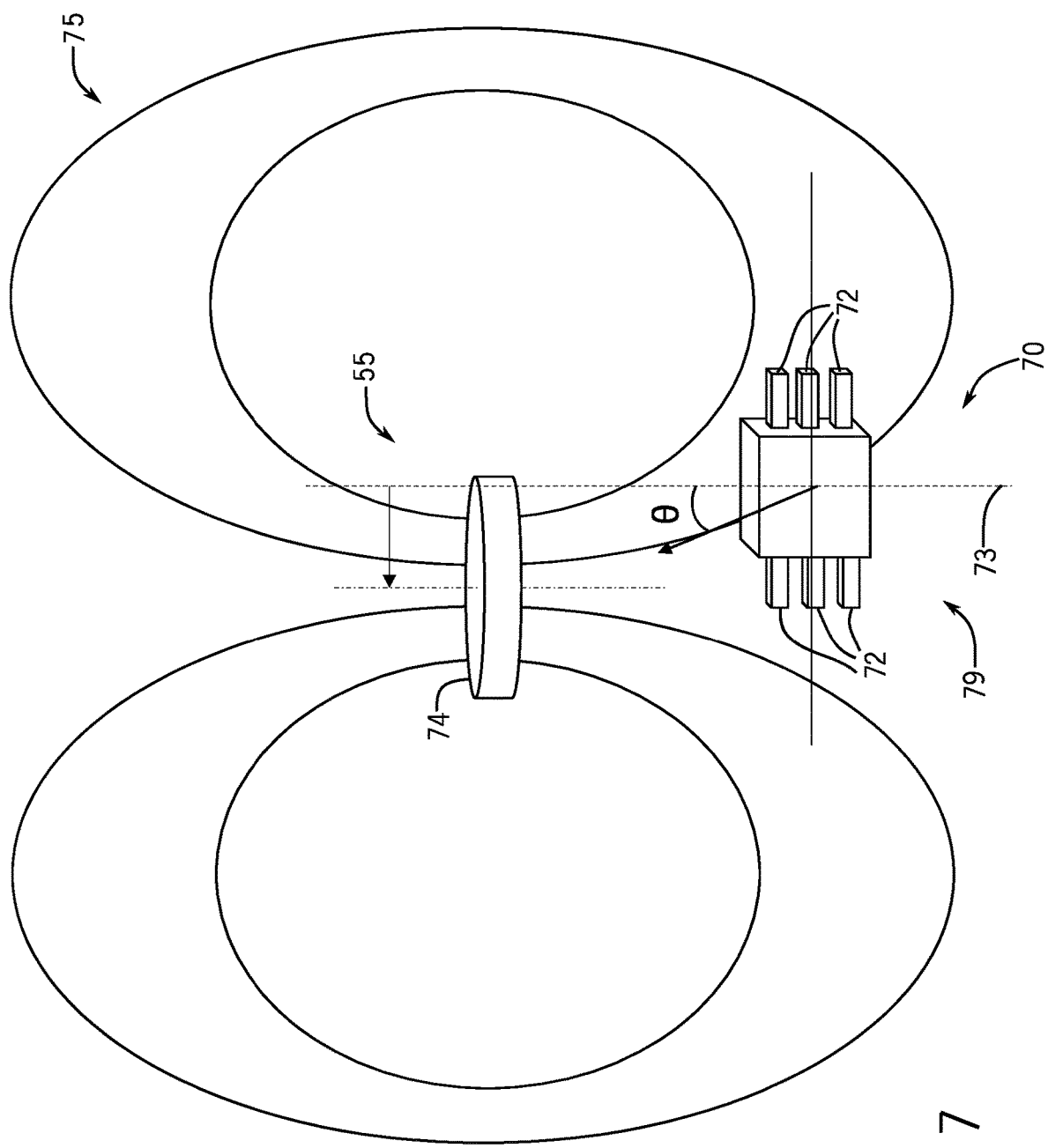
FIG. 7 shows a schematic view of the magnetoresistive system of FIG. 4 in a second position, in accordance with various embodiments of the present disclosure.

FIG. 7 is a schematic view of the magnetoresistive system 55 of FIG. 4 in a second position 79. As the movable member or hub 44 moves along the tool string 46 in the first direction 48 and the second direction 50 (FIG. 4), the angle θ of the magnetic field 75 relative the array 70 of magnetoresistive sensors 72 changes.

In a preferred embodiment, the magnetoresistive sensors 72 may be arranged in a Wheatstone bridge configuration and may be used in a saturated mode where an output of the sensor is a voltage and only depends on an angle θ of the magnetic field instead of a strength of the magnetic field 75, as long as the magnetic strength is greater than a certain value. In a preferred embodiment, the magnetoresistive system 55 comprises one magnet 74 and a plurality of magnetoresistive sensors 72 in an array 70, as previously described, to reduce the size of the magnet, reduce the likelihood of attracting magnetizable debris, and allow the tool string 46 to fit the required envelope. A plurality of arrays 70 may further be placed on a single board within the movable member or hub 44.

The magnetoresistive sensors 72 in the array 70 may suffer from manufacturing tolerances and positional tolerances (e.g., distance and angle) as compared to their theoretical value. To mitigate any variances, during assembly of the array 70, a baseline calibration may be run on the magnetoresistive sensors 72 in the array 70 to determine their manufacturing parameters (e.g., positions, gains, offsets, variation with temperature, etc.). The baseline parameters may be stored in a digital format in the tool for future reference.

Figure 8:
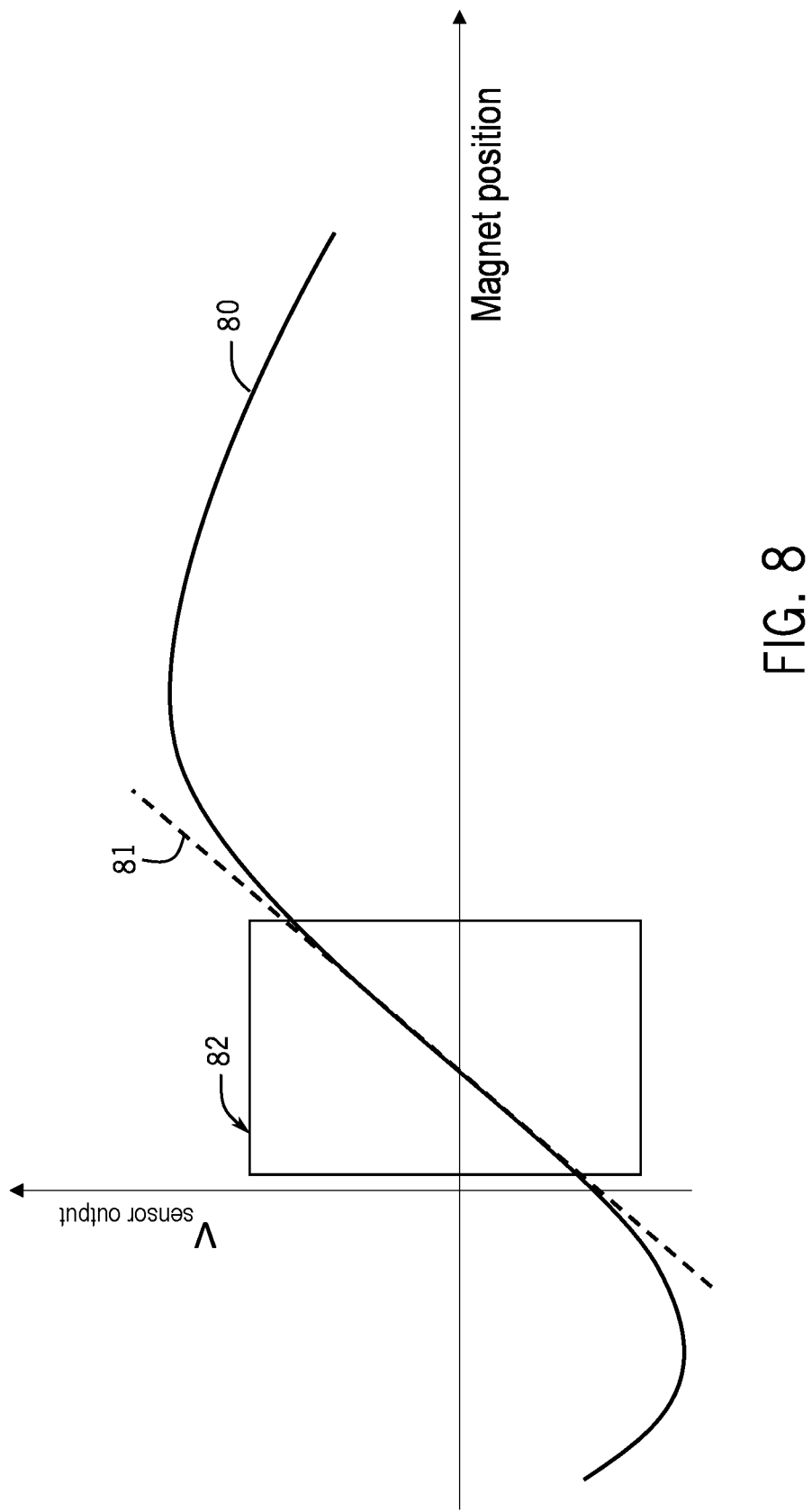
FIG. 8 shows a function of magnetoresistive sensor output of the magnetoresistive system of FIG. 6 as a function of magnet position, in accordance with various embodiments of the present disclosure.

FIG. 8 is an example plot 80 of magnetoresistive sensor 72 output voltage (of the magnetoresistive system 55 of FIG. 6) as a function of a position of the magnet 74. The sensor output depends on the magnetic angle, temperature, and input voltages. During operation, a routine scan of all sensors 72 in the array 70 measures the output voltage V, angle θ of magnetic field, and temperature. Other measurements may also be taken. Measurements from each sensor 72 may then be characterized (plot 80) to account for temperature and input voltages variation of the sensors 72 in the array 70. The most accurate measurement can be used to derive the position of the hub 44 using the previous baseline parameters stored in the tool.

As each magnetoresistive sensor 72 is disposed at a different location along the array 70, each sensor 72 will have a slightly different measurement with one or more of the magnetoresistive sensors 72 having more accurate readings than the other sensors 72 in an array 70. Determining which magnetoresistive sensors have greater accuracy in their measurement may be achieved by modeling expected measurements 81 based on the baseline parameters of each sensor 72. The modeled measurements 81 are compared with the actual measurements 80. Better estimates (i.e., more accurate) tend to be made when the magnetic angle θ is smaller where the sensors 72 are more likely to have a linear output in a range 82 (see where actual measurements 80 and modeled or predicted measurements 81 intersect). In this range 82, the estimation error is smaller, therefore more weight is applied to the sensor 72 whose output is in the more accurate range 82 to improve the output accuracy.

Figure 9:
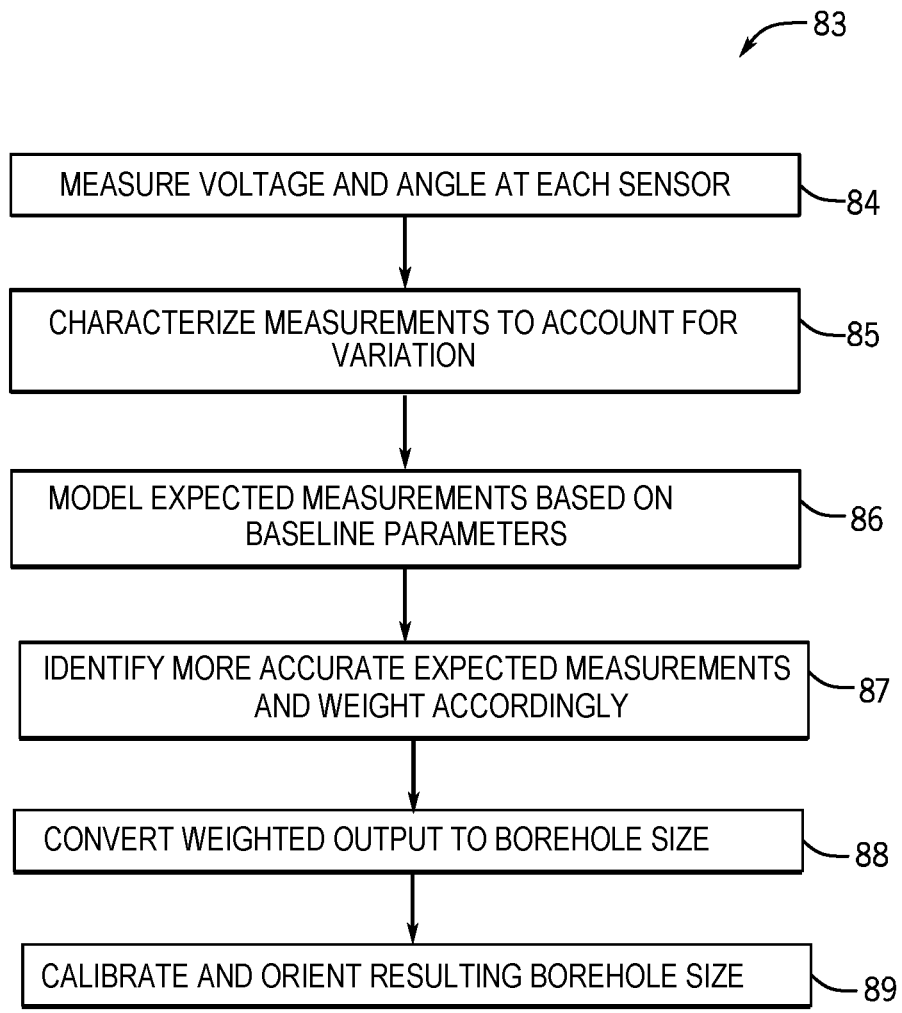
FIG. 9 shows a flow chart of an embodiment of a method for determining borehole size or diameter, in accordance with various embodiments of the present disclosure.

FIG. 9 is a flow chart of an embodiment of a method 83 for determining borehole size or diameter. Measurements are taken by each magnetoresistive sensor 72 at block 84. For example, the logging tool 30 may be extended through the drill bit 16 and into the borehole 18. The calipers 32 may be driven to radially expand via the springs 38. As mentioned above, the calipers 32 are coupled to the hub 44 and radial movement (e.g., expansion or compression) of the calipers 32 drives movement of the hub 44 along the logging tool axis 36. The magnet 74 in the hub 44 may interact with the magnetoresistive sensors 72. The resulting measurements may be characterized in block 85 to account for temperature and input voltages variation of the sensors 72 in the array 70.

Expected measurements 81 are modeled based on the baseline parameters of each sensor 72 in block 86. More accurate measurements are weighted more than less accurate measurements in block 87. The weighted output of the sensor array 70 is converted a borehole size with a mathematical function in block 88. The mathematical function depends on the shape of the springs 38 and the hub 44 position to the spacing between pads 34. This mathematical relationship may be used to translate the weighted output of the array 70 into a borehole size or diameter. For example, the relative position of the hub 44 with respect to the tool string 46 is related to the distance across both microresistivity pads 34.

The resulting borehole size may be further calibrated to account for bow spring and pad variation, wear, and small damages inherent to the method of deployment in block 89. This calibration may be made by constraining the pad faces to N known values and recording the measurements obtained. A polynomial of order N−1 may be used to calibrate the borehole size measurement where N is the number of known values used during the field calibration. Once computed, the borehole size measurement may be oriented using the inclinometer, magnetometer, or gyrometer and the borehole imaging tool construction data such that the orientation of the calibrated borehole size measurement is known. The image processing compresses the width of the image if the borehole size measurement is large or stretches the width if the borehole size measurement is lower. The orientation of the borehole wall features may then be mathematically derived using the caliper, inclinometer, and magnetometer, or gyrometer.

Figure 10:
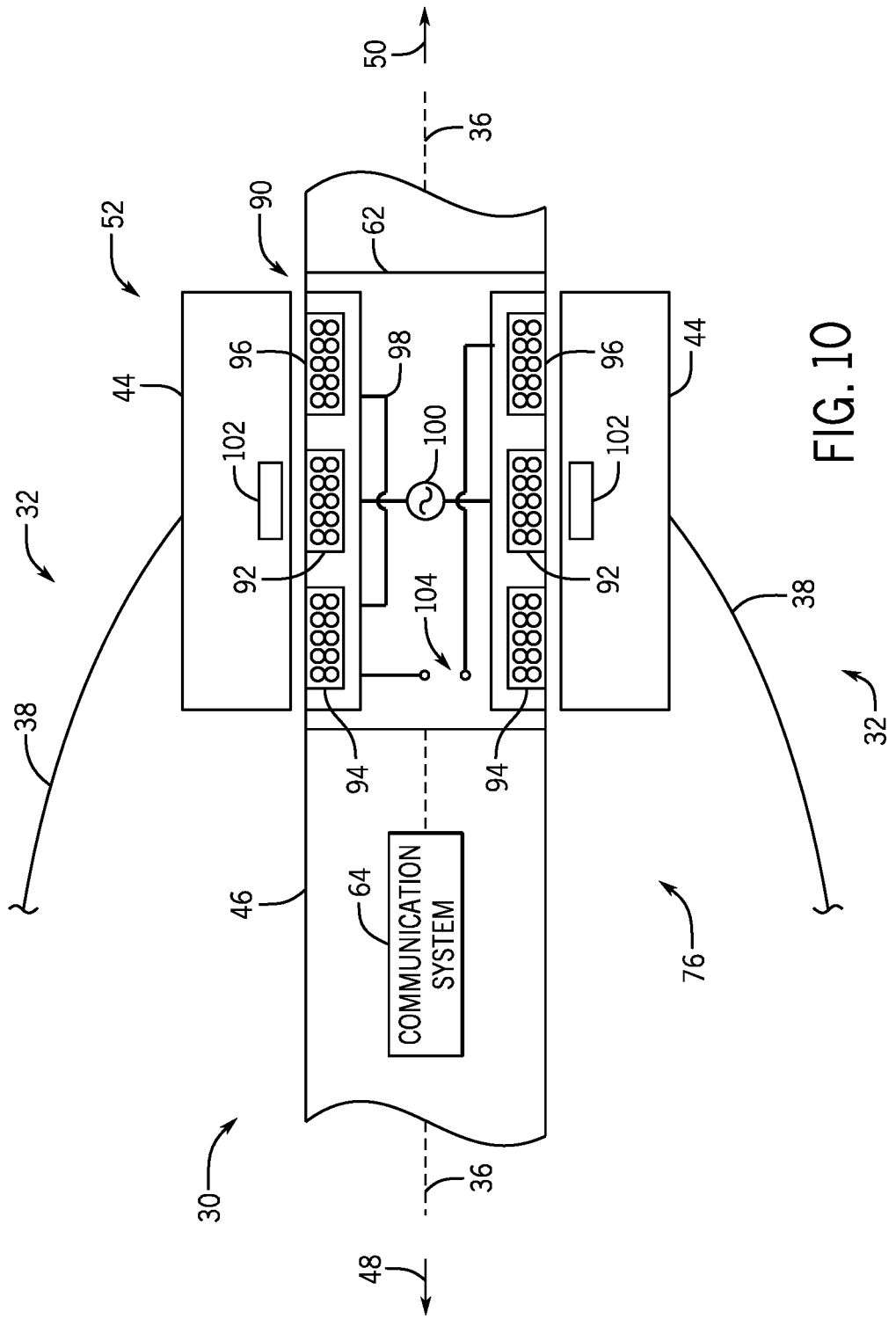
FIG. 10 shows a partial schematic cross-sectional view of an embodiment of a position system having a linear variable differential transformer in a first position, in accordance with various embodiments of the present disclosure.

FIG. 10 is a partial schematic cross-sectional view of an embodiment of the position sensor 62 positioned along the logging tool 30. As described above, the hub 44 is positioned about the tool string 46 and may move in the first direction 48 and the second direction 50 along the logging tool axis 36. In the illustrated embodiment, the position sensor 62 includes a linear variable differential transformer (LVDT) 90 in an inverse configuration from a typical LVDT. A standard LVDT has coils disposed about a ferromagnetic core; the position of the core is measured as it translates through the outer coils.

In the present embodiment, the LVDT 90 includes a primary coil 92, a top secondary coil 94, and a bottom secondary coil 96. Each coil 92, 94, 96 is wrapped around the interior circumference of the tool string 46. As shown, the top secondary coil 94 and the bottom secondary coil 96 are electrically coupled via a connecting wire 98. Moreover, the primary coil 92 is electrically coupled to a power source 100 configured to supply an alternating current to induce a voltage in the top secondary coil 94 and the bottom secondary coil 96 as the hub 44 moves axially along the tool string 46. In the illustrated embodiment, the hub 44 includes a core 102 configured to induce a voltage across the top secondary coil 94 and the bottom secondary coil 96 which may be measured as a differential at a junction 104. While the illustrated embodiment depicts the core 102 embedded within the hub 44, in other embodiments the hub 44 may be the core 102. Thus, unlike a traditional LVDT configuration, the coils 92, 94, 96 of the present embodiment are on the inside and the high magnetic permeability coupling material is on the outside.

In operation, movement of the hub 44 in the first direction 48 and the second direction 50 may induce a voltage at the junction 104. For example, in the illustrated embodiment, the hub 44 is in the first position 76 and the core 102 is substantially aligned with the primary coil 92. As a result, the top secondary coil 94 and bottom secondary coil 96 produce substantially equal and opposite voltages, thereby correlating to a differential voltage at the junction 104 of substantially zero. However, movement of the core 102 may induce voltages having different values and/or poles from the top secondary coil 94 and the bottom secondary coil 96. As a result, the differential voltage at the junction 104 may substantially correspond to the position of the core 102 along the tool string 46. For example, as described above, the calipers 32 may be calibrated to associate a given differential voltage with the radial position of the calipers 32.

Figure 11:
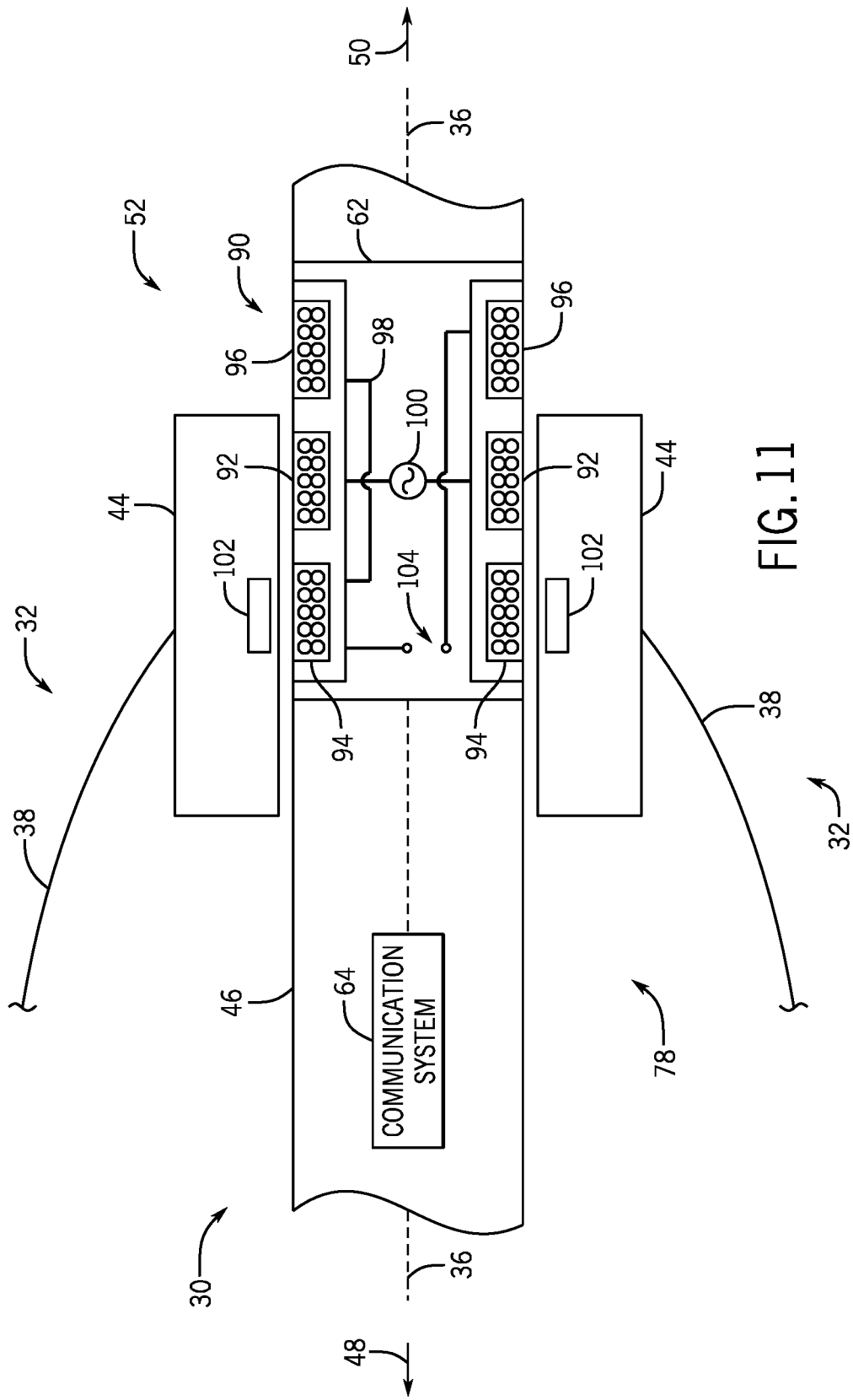
FIG. 11 shows a partial schematic cross-sectional view of the position system of FIG. 10 in a second position, in accordance with various embodiments of the present disclosure.

FIG. 11 is a partial schematic cross-sectional view of an embodiment of the position system 52 positioned along the logging tool 30. As mentioned above, the position system 52 includes the inverse configuration LVDT 90 having the primary coil 92, the top secondary coil 94, and the bottom secondary coil 96. In the illustrated embodiment, the hub 44 is moved in the first direction 48 along the logging tool axis 36 to the second position 78. For example, the calipers 32 may radially expand relative to the logging tool axis 36, thereby driving the hub 44 in the first direction 48. Because the core 102 moves with the hub 44, voltage in the top secondary coil 94 increases while voltage in the bottom secondary coil 96 decreases. Moreover, because the phase of the voltage across the top secondary coil 94 is the same as the phase of the voltage of the primary coil 92, the differential voltage measurement at the junction 104 may reveal that the hub 44 has moved in the first direction 48. Furthermore, movement in the second direction 50 would facilitate a larger voltage across the bottom secondary coil 96 having a phase opposite that of the primary coil 92. Accordingly, by measuring the differential voltage at the junction 104, the axial position of the hub 44 along the tool string 46 may be determined.

As mentioned above, the measured differential voltage at the junction 104 may be sent to the communication system 64. The communication system 64 may send the measure differential voltage to the controller 56 for processing. For example, the controller 56 may utilize data stored in the memory 60 to determine that the measured differential voltage correlates to an axial position of the hub 44 on the tool string 46, and therefore corresponds to the radial position of the calipers 32.

Figure 12:
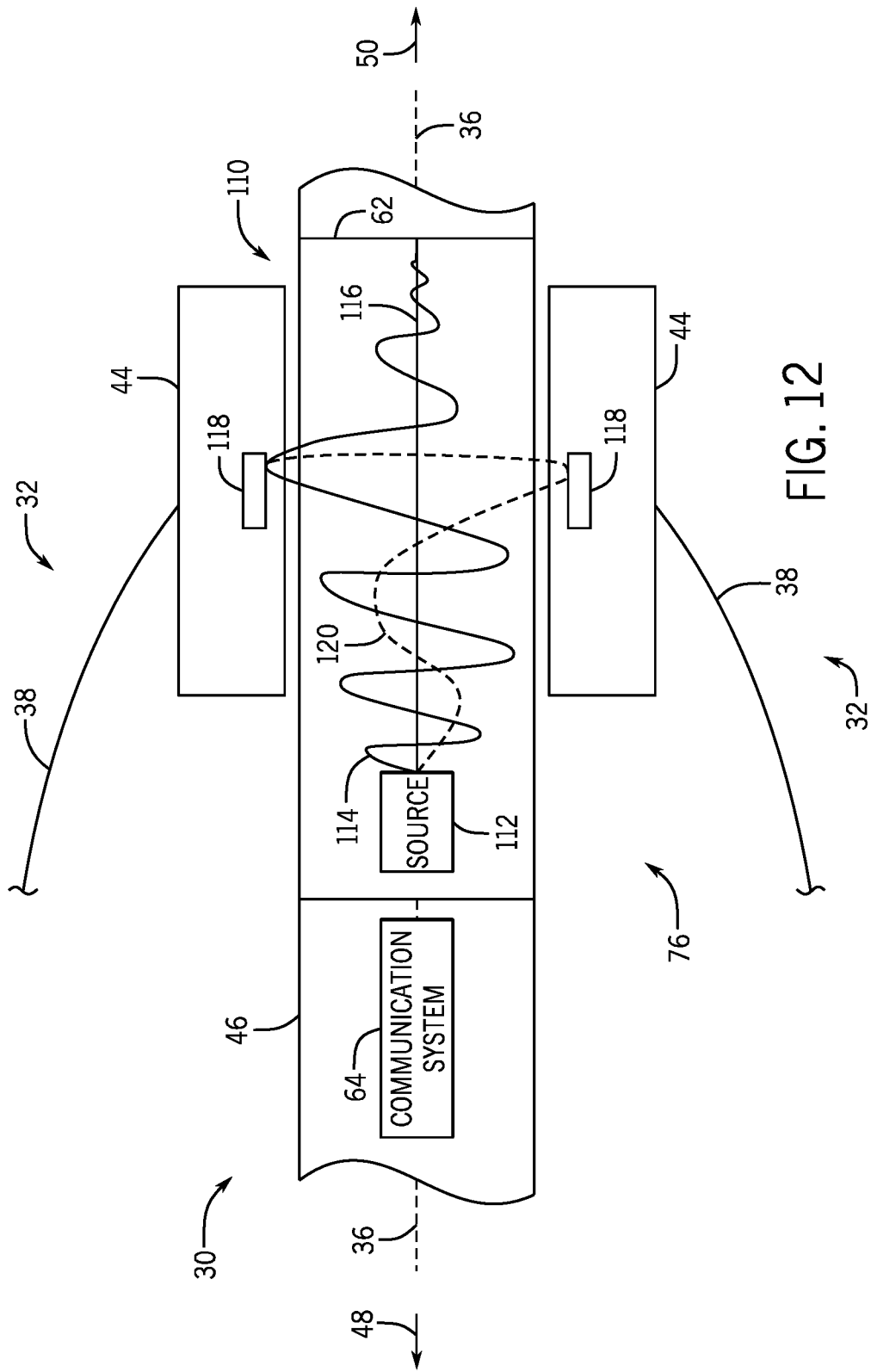
FIG. 12 shows a partial schematic cross-sectional view of an embodiment of a position system having a partial reflective system in a first position, in accordance with various embodiments of the present disclosure.

FIG. 12 is a partial schematic cross-sectional view of an embodiment of the position system 52 positioned along the logging tool 30. In the illustrated embodiment, the position sensor 62 includes a reflective sensor 110. The reflective sensor 110 includes a source 112 configured to transmit a signal 114 down a wire 116. For example, the signal 114 may be an electrical impulse. As shown, the hub 44 includes a reflector 118 embedded within the hub 44. For example, the reflector 118 may be a magnet configured to receive the signal 114 and reflect a reflected signal 120 back to the source 112. The source 112 may include a receiver configured to receive the reflected signal 120. In certain embodiments, the source 112 may include a timer configured to determine the time between emission of the signal 114 and reception of the reflected signal 120 to determine the axial position of the reflector 118. As will be appreciated, the axial position of the reflector 118 corresponds to the axial position of the hub 44.

In operation, the radial position of the calipers 32 drives the hub 44 axially along the logging tool axis 36 in the first direction 48 and the second direction 50. In the illustrated embodiment, the hub 44 is at the first position 76. As mentioned above, the first position 76 may correspond to the time elapsed between emitting the signal 114 and receiving the reflected signal 120, and thereby correspond to the radial position of the calipers 32 (e.g., via information stored in memory 60).

Figure 13:
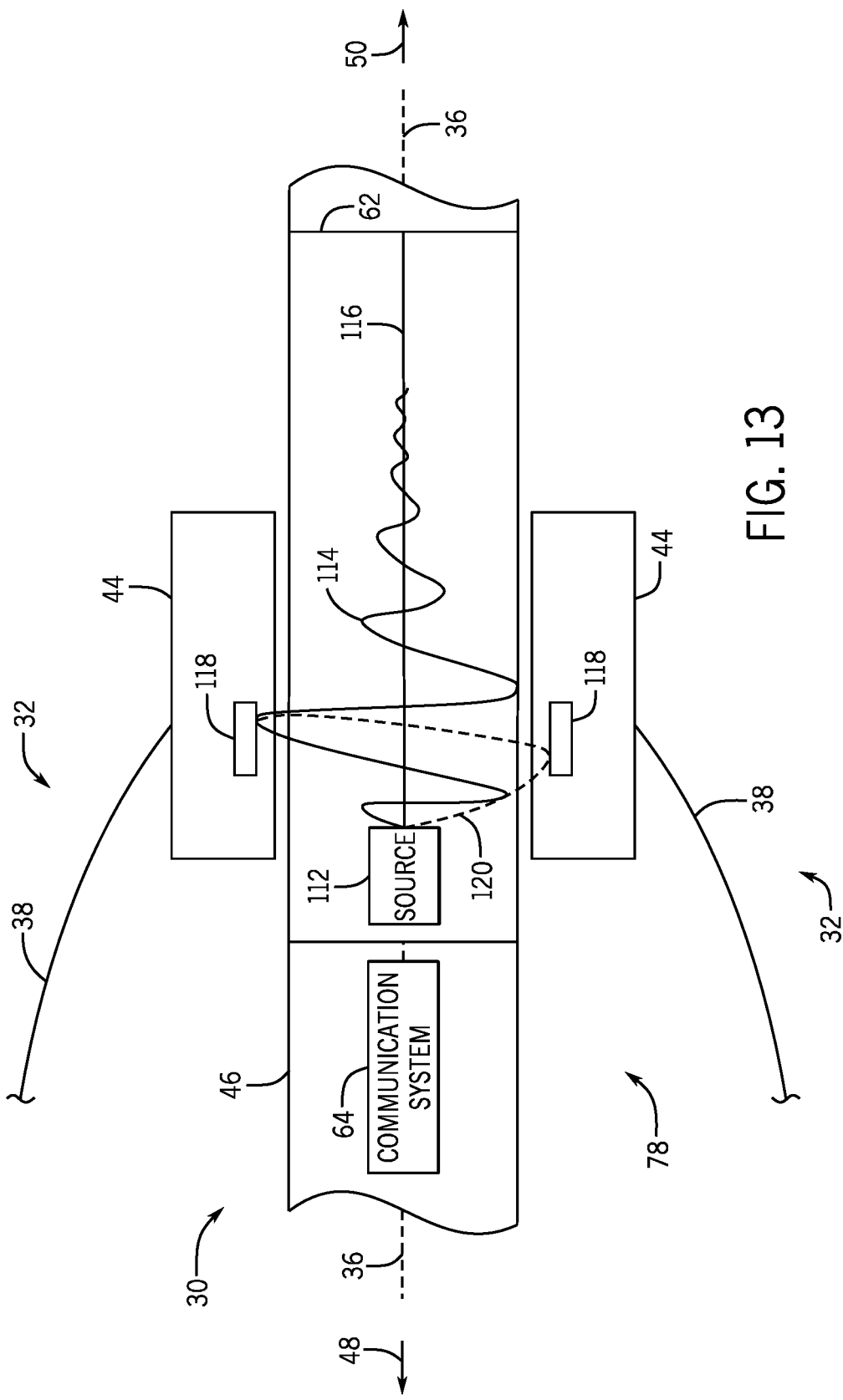
FIG. 13 shows a partial schematic cross-sectional view of the position system of FIG. 12 in a second position, in accordance with various embodiments of the present disclosure.

FIG. 13 is a partial schematic cross-sectional view of an embodiment of the position system 52 positioned along the logging tool 30. In the illustrated embodiment, the hub 44 is in the second position 78. In other words, the hub 44 moves axially along the logging tool axis 36 in the first direction 48. For example, the hub 44 may be driven in the first direction 48 by radial expansion of the calipers 32. As shown, the reflector 118 is positioned closer to the source 112 than while the hub 44 was in the first position 76. As a result, the time elapsed between emitting the signal 114 and receiving the reflected signal 120 is reduced, thereby indicating that the hub 44 is closer to the source 112. As mentioned above, the communication system 64 may send the elapsed time to the controller 56 to evaluate the position of the hub 44 based on the elapsed time. Accordingly, the axial position of the hub 44 may be utilized to determine the radial position of the calipers 32.

Figure 14:
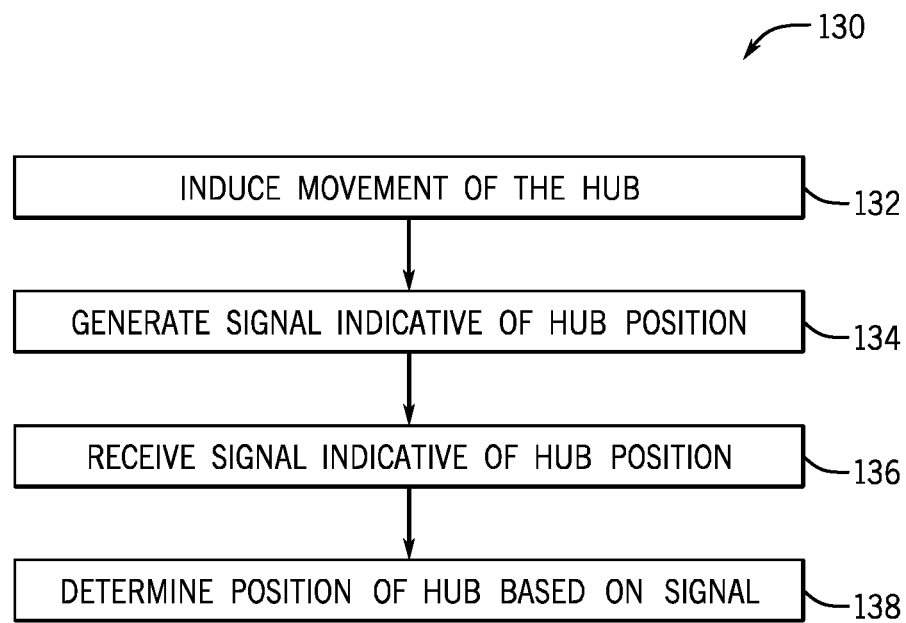
FIG. 14 shows a flow chart of an embodiment of a method for determining the radial position of a caliper tool, in accordance with various embodiments of the present disclosure.

FIG. 14 is a flow chart of an embodiment of a method 130 for determining the radial position of the caliper 32. Movement of the hub 44 is induced at block 132. For example, the logging tool 30 may be extended through the drill bit 16 and into the borehole 18. The calipers 32 may be driven to radially expand via the springs 38. As mentioned above, the calipers 32 are coupled to the hub 44 and radial movement (e.g., expansion or compression) of the calipers 32 drives movement of the hub 44 along the logging tool axis 36. A signal indicative of the hub position may be generated at block 134. For example, the hub 44 may interact with the position sensor 62 to produce a signal indicative of the hub position. In certain embodiments, the magnet 74 in the hub 44 may interact with the magnetoresistive sensors 72. In other embodiments, the hub 44 may induce a differential voltage across the top secondary coil 94 and the bottom secondary coil 96. Moreover, in other embodiments, the hub 44 may send the reflected signal 120 back to the source 112. The signal may be received by the communication system and/or the controller 56 at block 136. For example, as described above, the communication system 64 may be communicatively coupled to the position sensor 62. Additionally, the communication system 64 may send the signal to the controller 56 for evaluation. The radial position of the calipers 32 is determined at block 138. For example, the controller 56 may evaluate the signal indicative of the position of the hub 44 via the processor 58 utilizing data stored on the memory 60. In certain embodiments, the position of the hub 44 corresponds to a radial position of the calipers 32. For example, the hub position may be compared to a calibrated hub position. As a result, the radial position of the calipers 32 may be determined based on the axial position of the hub 44 along the tool string 46.

As described in detail above, embodiments of the present disclosure are directed toward the position system 52 configured to determine the radial position of the calipers 32. For example, the position system 52 includes the hub 44 configured to move axially along the logging tool axis 36. Movement of the hub 44 corresponds to the radial position of the calipers 32. Moreover, the position system 52 includes the position sensor 62. In certain embodiments, the position sensor 62 includes the magnetoresistive sensors 72 configured to interact with the hub 44 to produce a signal indicative of the position of the hub 44. Additionally, in other embodiments, the position sensor 62 includes the LVDT 90 configured to generate a differential voltage based on the position of the hub 44. Furthermore, in other embodiments, the position sensor 62 includes the reflective sensor 110 configured to indicate the position of the hub 44 based on the time elapsed between the emission of the signal 114 and the reception of the reflected signal 120. The position of the hub 44 along the tool string 46 may correspond to the radial position of the calipers 32. As a result, the position of the hub 44 may be utilized to determine the radial position of the calipers 32.

In an embodiment, a downhole tool includes a position system. The position system includes a hub moveably coupled to a fixed tool string. The hub includes a sensor component. The position system also includes a position sensor disposed within the fixed tool string and segregated from the sensor component. Additionally, the sensor component is at a first pressure and the position sensor is at a second pressure, different than the first pressure.

In another embodiment, a logging tool may be disposed in a borehole. The logging tool includes a linkage-less caliper tool that moves radially relative to the logging tool. The logging tool also includes a position system that detects a radial position of the caliper tool.

In a further embodiment, a method for determining a radial position of a caliper tool includes inducing movement of a hub coupled to the caliper tool. The hub moves in response to radial movement of the caliper tool. The method also includes generating a signal indicative of a hub position via a position sensor. The method further includes determining the radial position of the caliper tool based on the signal indicative of the hub position.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A logging tool, comprising:
a tool string having a longitudinal axis;
a plurality of springs comprising first and second pairs of springs coupled to the tool string, wherein the springs of the first pair are disposed opposite one another about the longitudinal axis, a first end of each spring of the plurality of springs is rigidly fixed to the tool string to block both axial motion of the first end along the longitudinal axis and rotational motion of the first end about the longitudinal axis, the first end of each spring of the first pair of springs is disposed at a first axial position along the tool string, the first end of each spring of the second pair of springs is disposed at a second axial position along the tool string, and the first and second axial positions are different from one another;
a plurality of sensors, wherein one sensor of the plurality of sensors is disposed on one spring of the first pair of springs, and another sensor of the plurality of sensors is disposed on one spring of the second pair of springs;
a first hub connected to a second end of each spring of the first pair of springs, wherein the first hub is disposed about and moveably coupled to the tool string, and wherein the first hub comprises a first magnet having a first magnetic field; and
an array of magnetoresistive sensors disposed in the tool string such that the first hub is configured to move along the longitudinal axis of the tool string about the array of magnetoresistive sensors.

2. The logging tool of claim 1, wherein the logging tool is configured to be stored within a drill string extending into a borehole, and wherein the logging tool is configured to extend through a drill bit disposed on an end of the drill string.

3. The logging tool of claim 2, wherein the logging tool is configured to make borehole measurements while the drill string is being removed from the borehole.

4. The logging tool of claim 1, wherein the first magnetic field of the first magnet is configured to interact with the array of magnetoresistive sensors as the first hub moves along the longitudinal axis of the tool string about the array of magnetoresistive sensors.

5. The logging tool of claim 1, wherein at least one sensor of the plurality of sensors is configured to measure a property of a formation when the logging tool is disposed within a borehole located within the formation.

6. The logging tool of claim 5, wherein the logging tool is configured to press the at least one sensor against a sidewall of the borehole to measure the property of the formation when the logging tool is disposed within the borehole.

7. The logging tool of claim 5, wherein the at least one sensor is a non-contact sensor configured to remain out of contact with a sidewall of the borehole when the property of the formation is measured.

8. The logging tool of claim 1, wherein disposing the array of magnetoresistive sensors in the tool string causes the array of magnetoresistive sensors to be at a pressure substantially equal to atmospheric pressure when the logging tool is disposed within a borehole.

9. The logging tool of claim 1, wherein an inner surface of a bore defined by the first hub that is disposed about the tool string and an outer surface of the tool string are separated by a gap and directly opposed to one another.

10. The logging tool of claim 9, wherein an outer cross-sectional shape of the tool string the hub is disposed about and moveably coupled to includes a corner.

11. The logging tool of claim 1, wherein an outer cross-sectional shape of the tool string the first hub is disposed about and moveably coupled to includes a corner.

12. The logging tool of claim 11, wherein:
the logging tool is configured to be stored within a drill string extending into a borehole located within a formation, and
the logging tool is configured to extend through a drill bit disposed on an end of the drill string and into the borehole.

13. The logging tool of claim 12, wherein the logging tool is configured to make borehole measurements while the drill sting is being removed from the borehole.

14. The logging tool of claim 13, wherein:
at least one sensor of the plurality of sensors is configured to measure a property of a formation when the logging tool is disposed within the borehole, and
the at least one sensor is a non-contact sensor configured to remain out of contact with a sidewall of the borehole when the property of the formation is measured,
wherein disposing the array of magnetoresistive sensors in the tool string causes the array of magnetoresistive sensors to be at a pressure substantially equal to atmospheric pressure when the logging tool is disposed within the borehole.

15. The logging tool of claim 1, wherein the springs of the second pair are disposed opposite one another about the longitudinal axis.

16. The logging tool of claim 1, wherein the plurality of springs are circumferentially offset from one another about the longitudinal axis.

17. The logging tool of claim 16, wherein the first ends of the first pair of springs are disposed axially between the first and second ends of the second pair of springs, and the second ends of the second pair of springs are disposed axially between the first and second ends of the first pair of springs.

18. The logging tool of claim 17, wherein:
the one sensor of the plurality of sensors is disposed on the one spring of the first pair of springs between the first and second ends of the one spring of the first pair of springs; and
the another sensor of the plurality of sensors is disposed on the one spring of the second pair of springs between the first and second ends of the one spring of the second pair of springs.

19. The logging tool of claim 1, comprising a second hub connected to the second end of each spring of the second pair of springs, wherein the second hub is disposed about and moveably coupled to the tool string.

20. The logging tool of claim 19, wherein the second hub comprises a second magnet having a second magnetic field, and the second hub is configured to move along the longitudinal axis of the tool string about the array of magnetoresistive sensors.

* * * * *